United States Patent [19]

Kammiller

[11] 4,429,233

[45] Jan. 31, 1984

[54] SYNCHRONIZING CIRCUIT FOR USE IN PARALLELED HIGH FREQUENCY POWER SUPPLIES

[75] Inventor: Neil A. Kammiller, Lakewood, Ohio

[73] Assignee: Reliance Electric Company, Cleveland, Ohio

[21] Appl. No.: 425,328

[22] Filed: Sep. 28, 1982

[51] Int. Cl.$^3$ .............................................. H02J 3/08
[52] U.S. Cl. .................................... 307/87; 307/64
[58] Field of Search ................. 307/44, 46, 48, 80, 307/71, 84, 87, 64

[56] References Cited

U.S. PATENT DOCUMENTS 4,164,661 8/1979 Hucker et al. .................. 307/84 X
4,177,389 12/1979 Schott ............................ 307/44 X

FOREIGN PATENT DOCUMENTS 2478391 9/1981 France ................................. 307/87

Primary Examiner—E. A. Goldberg
Assistant Examiner—D. Jennings
Attorney, Agent, or Firm—Michael M. Rickin

[57] ABSTRACT

A synchronizing circuit for use in each high frequency power supply of a combination in which two or more identical such supplies are connected in parallel across a load. The circuit allows the supplies to be synchronized in phase and frequency to each other. Synchronization is accomplished by having the circuit allow the supply with the highest operating frequency to be designated as the master and provide the synchronizing signal to the other slower running supplies in the parallel combination.

9 Claims, 2 Drawing Figures

SYNCHRONIZING CIRCUIT FOR USE IN PARALLELED HIGH FREQUENCY POWER SUPPLIES

BACKGROUND OF THE INVENTION

1. Field of the Invention

This invention relates to high frequency power supplies and more particularly to a circuit for use in such supplies for providing frequency and phase synchronization therebetween when two or more identical such supplies are connected in parallel across a load.

2. Description of the Prior Art

Many types of power supplies now make use of the well-known pulse width modulation (p.w.m.) technique to provide a signal to drive one or more power switching devices at a relatively high frequency. The power supply may be of the type wherein the p.w.m. signal is used directly to drive the one or more power switching devices or it may be of the type wherein the p.w.m. signal is used to derive signals such as phase shifted squarewaves to drive the power switching devices.

The p.w.m. technique makes use of a sawtooth waveform of predetermined frequency for purposes of generating the drive signal to the power switching devices. Typically the frequency of the sawtooth waveform is in the order of 20 KHz when the supply has a single power switching device and in the order of 40 KHz when the supply has two or more power switching devices arranged, for example, in a half bridge or full bridge configuration.

In many such high frequency supplies an oscillator is included to generate pulses which are usually at the same frequency as the desired sawtooth waveform. The occurrence of these pulses is then used by appropriately arranged circuit elements as a signal for terminating the prior cycle of the sawtooth waveform and initiating the generation of the next cycle thereof.

In many instances the specifications of the system wherein a high frequency power supply of the type described above is to be used require that two or more identical such supplies be connected in parallel across the system load. The supplies may share the load on a substantially equal basis or one or more supplies may provide power to the load while the remaining paralleled supplies serve as back-up supplies which also provide a small amount of power to the load. In any case, it is desirable that the paralleled supplies operation be synchronized with each other, both in frequency and phase.

Such synchronization of operation could theoretically be obtained by adjusting the frequency of the oscillators of each supply such that all of the paralleled supplies generate their high frequency pulses at the same time. All of the paralleled supplies would then terminate one cycle of the sawtooth waveform and initiate generation of the next cycle at the same time. In this manner, the operation of each of the paralleled supplies would then be synchronized with respect to each other.

While such an adjustment would theoretically provide the desired synchronization, it is not possible on a practical basis to adjust the oscillators of each supply in such a manner. In fact, even if it were possible to so adjust the oscillators prior to the shipment of the supplies from the factory, the variation in oscillation component values as a result of usage would cause the paralleled supplies to lose their synchronization with each other in a relatively short amount of time. In addition, any necessity to change oscillator components in the field and still have synchronism would present the serviceman with a task beyond that ordinarily associated with such endeavors.

Another way in which paralleled supplies can be synchronized in operation is by the use of a master clock signal which is supplied from a source external to the paralleled oscillators. While such a source might be readily available where the load is of the type which includes its own clock source, there are many types of loads which do not have their own clock. In addition, while such a clock signal may be obtained from an external source which is not in the load, operation of the supplies in parallel then requires that they each be connected to that source. Finally, the use of such a clock makes synchronization of the paralleled supplies dependent on a source whose loss will surely cause the supplies to operate in a non-synchronous manner.

It is, therefore, desirable that synchronism between paralleled identical high frequency supplies be obtained in a manner which does not require careful initial and possible continual adjustment of the frequency of the oscillators used therein. It is also desirable that synchronism be obtained without reliance on an external source of master clock signals. It is also desirable that at any given time the supply whose oscillator runs at the highest frequency be used as the master and that the oscillators of the slower running supplies be synchronized thereto. It is also desirable that each of such paralleled supplies have circuitry included therein which allows this synchronization to take place in a relatively simple and inexpensive manner. Finally, it is desirable that this circuitry have sufficient flexibility such that as oscillator operating frequencies change with changes in oscillator component values the choice of the supply used as the master shift to that supply whose oscillator operates at the highest frequency. Such circuitry ensures that slight variations in oscillator operating frequency between identical paralleled supplies does not prevent the supplies from being synchronized in phase and frequency with each other. Such variations may arise as described above from the inability to adjust all supplies to the exact same operating frequency at the factory as well as from the change in component values with age.

SUMMARY OF THE INVENTION

A circuit for use in a high frequency power supply of the type which includes an oscillator for generating a high frequency signal which is used by the supply to derive the drive signal(s) to the one or more power switching devices in the supply. The circuit allows at least one other supply of the same type which also includes the circuit to be operated in synchronism when both are connected in parallel across the same load.

The circuit comprises a transformer which has a first winding which is connected in parallel with the first winding of the transformer in the circuit included in the other paralleled supplies. The transformer also has a second winding across which the synchronizing signal appears. A conduction means connects the synchronizing signal to the oscillator. The conduction means also connects the high frequency signal generated by the oscillator to the second winding. The oscillator generates the high frequency signals in response to the synchronizing signal when that signal occurs in time before the oscillator reaches its predetermined time-out. The synchronizing signal is received on the first winding from one of the other paralleled supplies. The oscillator generates the high frequency signals in response to the time-out when the time-out occurs before a synchronizing signal is received. In that case, the conduction means conducts to allow the high frequency signal to be connected to the transformer and therefore become the synchronizing signal.

DESCRIPTION OF THE PREFERRED EMBODIMENT

Figure 1:
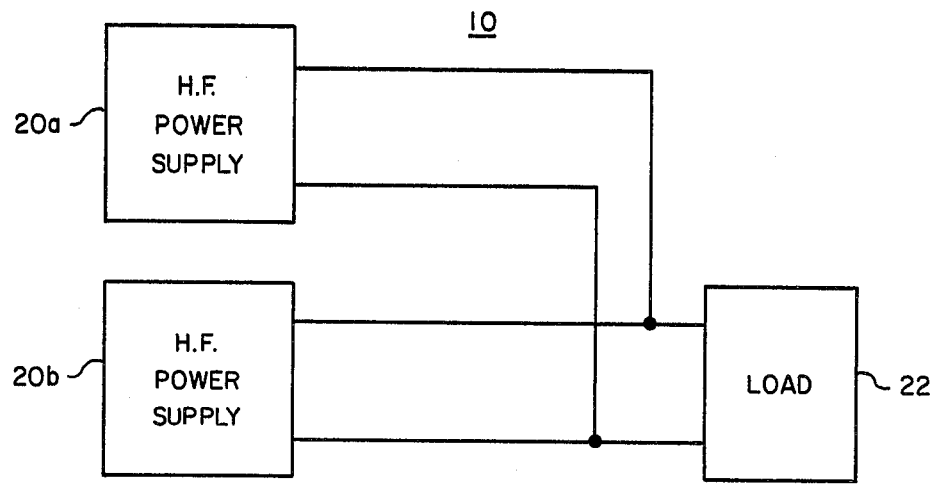
FIG. 1 is a block diagram of a power system having two high frequency supplies connected in parallel across a load.

Referring to FIG. 1 there is shown a system 10 wherein the two identical high frequency power supplies 20a and 20b are connected in parallel with load 22. The supplies may be connected to the load in a manner such that one of the supplies, for example 20a, provides almost the total power requirements of the load, whereas the other of the supplies 20b serves as a back-up which provides only a small amount of power to the load. In certain systems it may be desirable that the paralleled supplies share the load on a substantially equal basis. Such an arrangement minimizes any transient disturbances which may occur in the load when one of the two paralleled supplies is required to provide the total load power requirement.

Power supplies 20a and 20b are identical and are of the type which use the well-known and high frequency pulse width modulated technique for providing a drive signal or signals for the power switching device or devices used therein. Supplies 20a and 20b may, for example, be d-c to d-c converters which use the high frequency techniques to provide from a d-c input voltage one or more regulated d-c output voltages to load 22. In this case, load 22 may be an electrical circuit which uses the d-c voltage(s) for the operation of the components therein.

Supplies 20a and 20b may, for example, also be rectifiers which use the high frequency techniques to provide from an input a-c voltage, such as the 60 Hz voltage from a public utility, an output d-c voltage of proper amplitude to load 22. In that case, load 22 may be either a battery or bank of batteries and/or an electronic circuit. Where the load is the batteries, either alone or in combination with the electronic circuit, the supply is used to recharge or maintain the charge on the battery and/or supply some or all of the operating voltages for the electronic circuit. In some instances, the supplies 20a, 20b take the place of the batteries to provide the d-c voltage to the load.

In any case, no matter what form is taken by high frequency power supplies 20a and 20b, each of the supplies includes therein an oscillator whose output is used to terminate the generation of one cycle of the sawtooth waveform associated with the p.w.m. technique and initiate the next cycle thereof. Each of supplies 20a and 20b also includes the circuit of the present invention shown in FIG. 2, to be described in more detail hereinafter, which allows the oscillators of the paralleled supplies to be synchronized to each other in both phase and frequency.

It should be appreciated that while FIG. 1 has shown a system 10 having only two such identical supplies in parallel with load 22, the requirements of the system may be such that a larger number of identical supplies be in parallel with the load. The circuit of the present invention maintains synchronism between any number of paralleled identical supplies and also allows a supply to be connected in parallel with one or more identical supplies without affecting the synchronism therebetween.

Figure 2:
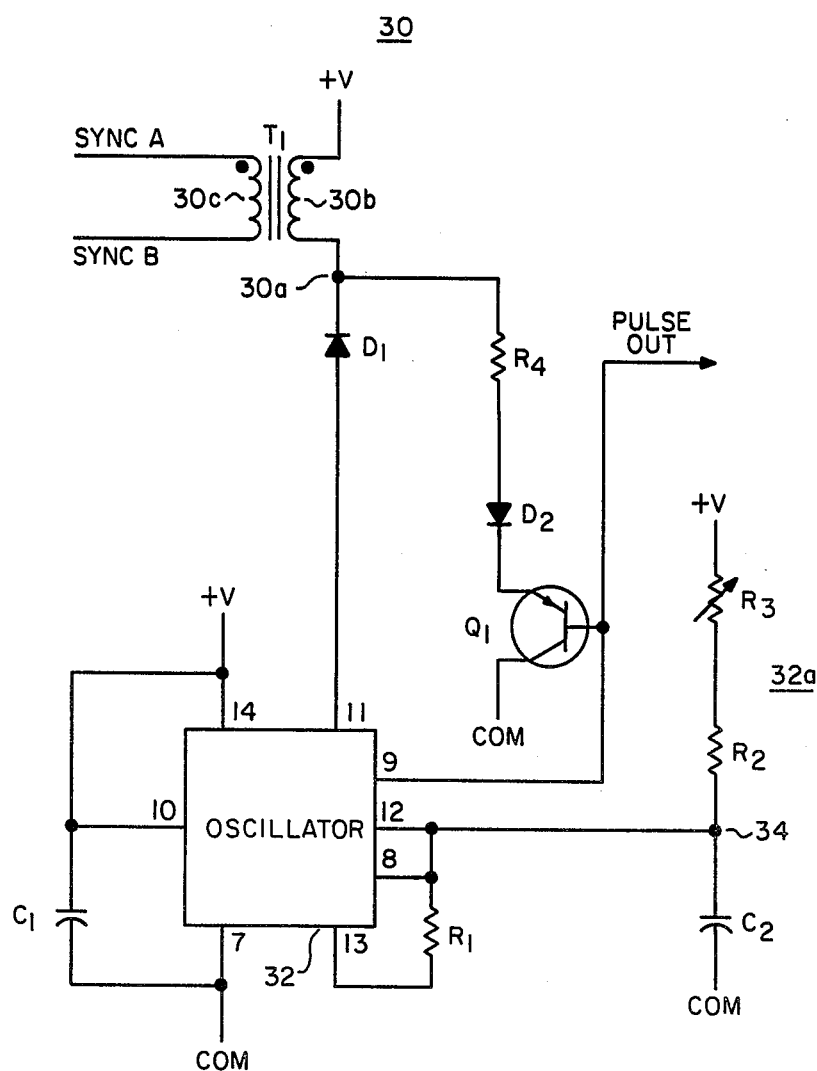
FIG. 2 is a schematic diagram of the synchronizing circuit according to the present invention.

Referring to FIG. 2 there is shown the circuit 30 which is included in a high frequency supply to allow that supply to be synchronously connected in parallel with one or more identical supplies. Circuit 30 is included in all of the supplies, even if each of the supplies is not initially connected in parallel with other identical supplies.

Circuit 30 is used in each supply in conjunction with the high frequency oscillator 32 included therein. For ease of illustration, it has been assumed that the oscillator is embodied by the 556 timer chip type which is commercially available from any one of a number of known integrated circuit chip manufacturers such as National Semiconductor. For ease of understanding, the pin numbers shown in oscillator 32 are those actually associated with the 556 chip. Oscillator 32 generates at pin 9 a negative-going pulse which may be used either directly or after pulse shaping by the sawtooth waveform generating circuitry of the supply.

In the absence of any external signals on pin 11, oscillator 32 generates pulses at a frequency which is determined by timing circuit 32a. This circuit is formed by the combination of capacitor C2 and fixed resistor R2 in series with adjustable resistor R3. One end of capacitor C2 is connected to supply common and the other end is connected at junction 34 to one end of resistor R2. This junction is in turn directly connected to pins 12 and 8 of oscillator 32. The other end of resistor R2 is connected to one end of resistor R3 which has its other end connected to the positive voltage, +V. Pin 8 of the oscillator is connected by a resistor R1 to pin 13 thereof. This resistor in combination with capacitor C2, as will be described hereinafter, determines the width of the pulse which appears at timer output pin 9.

In the absence of any pulses on pin 11, oscillator 32 runs at the frequency determined by the timing circuit 32a. Internal to the oscillator is a resistive divider network (not shown) which in the absence of any such pulses on pin 11 allows the oscillator to generate an internal sawtooth at the timing circuit determined frequency. This sawtooth is internal to the 556 chip and is not in any way associated with the sawtooth waveform of the p.w.m. circuitry of the supply. In each cycle this sawtooth starts at the lower threshold voltage, +V/3, and terminates when capacitor C2 has charged to the upper threshold, +2V/3. The oscillator then generates at pin 9 a negative-going pulse whose width is determined by R1 and C2. The occurrence of a pulse on pin 11 which is generated by the synchronizing circuit of another supply (hereinafter referred to as an "external synchronizing pulse") causes the internal sawtooth of the oscillator to prematurely terminate. The external synchronizing pulses to pin 11 reduce the upper threshold voltage to be less than +2V/3. In the presence of such external synchronizing pulses, oscillator 32, therefore, generates pulses at pin 9 which occur at a frequency which is higher than the frequency at which the pulses would occur if determined solely by the timing circuit.

Synchronizing circuit 30 provides the pulses on pin 11 in the manner to be described below. Pin 11 is connected by a diode D1, poled as shown, to the nondotted end of a winding 30b of a transformer T1. This connection occurs at the junction designated as 30a. The dotted end of the winding is connected to a source of positive voltage, +V. Transformer T1 has a winding 30c whose dotted end is connected to the terminal designated as Sync A and whose nondotted end is connected to the terminal designated as Sync B. When the supply in which circuit 30 is included is connected in parallel with other identical supplies which also include circuits identical to 30, then the Sync A and Sync B terminals of all such circuits are connected to each other. In this manner, the windings 30c of each identical paralleled supply are connected in parallel with each other. Transformer T1 then provides the desired noise immunity and isolation for each circuit 30.

Junction 30a is also connected by the series combination of a resistor R4 and a diode D2, poled as shown, to the emitter of PNP transistor Q1. The collector of Q1 is connected to circuit common and the base of the transistor is connected directly to pin 9 of oscillator 32. Transistor Q1 acts as a buffer and also provides additional driving capability for the signal to be transmitted on winding 30c to the other paralleled supplies. Transistor Q1 may be eliminated from circuit 30 if the buffering and additional drive capability is not required.

The operation of circuit 30 will first be described in connection with its use in a single unparalleled supply and then with its use in identical supplies such as 20a and 20b of FIG. 1 which are connected in parallel across a load such as 22. In a single unparalleled supply, the Sync A and Sync B terminals of circuit 30 remain unconnected and, therefore, a signal from the circuit 30 of another supply cannot appear across those terminals. In that case, the operation of oscillator 32 is determined solely by timing circuit 32a. Oscillator 32 therefore generates pulses on pin 9 at the rate determined by the timing circuit. The generation of a pulse on pin 9 causes transistor Q1 to conduct and generate a pulse. The transistor is nonconductive where there is no pulse on pin 9. The pulse generated by the transistor is connected by diodes D1 and D2 and resistor R4 to pin 11 of oscillator 32. The application of this pulse has the effect of reinforcing the pulse generated on pin 9 of the oscillator. The transistor pulse is also applied to winding 30b of transformer T1. Thus, in a single unparalleled supply synchronizing circuit 30 has no effect on the generation of pulses by oscillator 32.

Where two or more identical supplies are connected in parallel, the Sync A and Sync B terminals of their respective circuit 30 are connected to each other. For ease of description, it is assumed that only two such supplies 20a and 20b are connected in parallel and that the component values of each supply are such that the oscillator of supply 20a runs slightly faster than the oscillator of supply 20b. In that case, oscillator 32 of supply 20a generates a pulse on its pin 9 which is solely determined by its own timing circuit 32a. In turn, the associated transistor Q1 is caused to conduct and provide a pulse to winding 30b of transformer T1.

By transformer action, that pulse appears on the winding 30c of the transformer. As windings 30c of supplies 20a and 20b are connected in parallel with each other, the pulse also appears on the winding 30c of the circuit 30 contained in supply 20b. By transformer action, that external synchronizing pulse appears across winding 30b of that circuit 30 and is connected by the diode D1 to pin 11 of the associated oscillator 32. As the timing circuit 32a of the oscillator of supply 20b has been assumed to run slower than the timing circuit of supply 20a, the external synchronizing pulse which appears on pin 11 of the oscillator of supply 20b occurs in time before capacitor C2 of the timing circuit has charged to the upper threshold. In response to that external synchronizing pulse, the oscillator of supply 20b generates a pulse at its pin 9. Except for propagation delays which may be ignored as they are negligible, the synchronizing circuit of supply 20b forces the oscillator of that supply to run at the higher frequency of the oscillator of supply 20a. Therefore, when identical supplies each containing a circuit 30 are connected in parallel, it is the supply which has the fastest running oscillator which becomes the master to which the oscillators in the other supplies are synchronized.

It should be appreciated that, while the operation of a synchronizing circuit 30 has been described in connection with only two identical paralleled supplies, the circuit will operate to cause synchronization for any number of identical supplies connected in parallel, provided each such supply is equipped with a circuit 30. It should also be appreciated that the supply to which the other paralleled supplies are synchronized depends solely on which supply has the fastest running oscillator at any given time.

As the frequencies of the oscillators may change with time due to any one of a number of reasons, such as change in component values due to aging or replacement of components, the oscillator which runs the fastest at any one time may not be the same as the one which ran the fastest when the supplies were first connected in parallel. This change in oscillator frequency with time has no effect on the operation of the synchronizing circuit. Circuit 30 always synchronizes the paralleled supplies to the one with the fastest running oscillator. Similarly, when additional supplies are added to an already existing paralleled combination or when a supply in such a combination is replaced by another, circuit 30 always synchronizes all of the supplies to the one with the fastest oscillator. Thus, where a number of identical supplies are connected in parallel, it is not necessary to designate one supply as the master for purposes of synchronization. Circuit 30 selectes the master at any given time based solely on the frequency of the respective oscillators.

In a typical circuit 30 constructed in accordance with the present invention, transformer T1 had a winding 30c which contained four times the number of turns contained in winding 30b. In addition, the following component values were used for the components of synchronization circuit 30 and oscillator 32:

$R1 = 1 \times 10^3$ ohms
$R2 = 33.2 \times 10^3$ ohms
$R3 = 20 \times 10^3$ ohms (adjustable)
$R4 = 47.5$ ohms
$C1 = 0.1$ microfarads
$C2 = 470$ picofarads It is to be understood that the description of the preferred embodiment is intended to be only illustrative, rather than exhaustive, of the present invention. Those of ordinary skill will be able to make certain additions, deletions, and/or modifications to the embodiment of the disclosed subject matter without departing from the spirit of the invention or its scope, as defined by the appended claims.

What is claimed is:

1. A circuit for use in a power supply of the type which includes an oscillator means having a predetermined time-out for generating a high frequency signal which is used by said power supply to derive one or more signals to drive the one or more power switching devices included in said supply said circuit allowing said supply and at least one other supply of said type which includes said circuit to be operated in synchronism when connected in parallel across a load, said circuit comprising:
   (a) transformer means having a first winding connected in parallel with another first winding of said transformer means in said circuit included in said at least one other paralleled supply and having a second winding across which a synchronizing signal appears; and
   (b) conduction means responsive to said synchronizing signal for connecting said synchronizing signal to said oscillator means and responsive to said high frequency signal for connecting said high frequency signal to said second winding said oscillator means generating said high frequency signal in response to said synchronizing signal when said synchronizing signal occurs in time before said predetermined time-out said synchronizing signal being received on said first winding and said oscillator means generating said high frequency signal when said predetermined time-out occurs before said first winding receives a synchronizing signal the conduction of said conduction means allowing said high frequency signal to be connected to said second winding to thereby become said synchronizing signal.

2. The circuit of claim 1 wherein said conduction means includes a first unidirectional conduction means responsive to said synchronizing signal and a second unidirectional conduction means responsive to said high frequency signal.

3. The circuit of claim 2 wherein said oscillator means has a control input and an output and said first and second unidirectional conduction means are first and second diodes said first diode connecting said control input to said second winding and said second diode connecting said output to said second winding.

4. The circuit of claim 2 or 3 wherein said conduction means further includes switching means connected between said second unidirectional conduction means and said oscillator means said switching means conducting in response to said high frequency signal.

5. The circuit of claim 4 wherein said switching means is a transistor having its collector connected to circuit common, its base connected to said oscillator means to receive said high frequency signal and its emitter connected to said second unidirectional conduction means.

6. A circuit for use in a power supply of the type which includes an oscillator means having a predetermined time-out for generating a high frequency signal which is used by said power supply to derive one or more signals to drive the one or more power switching devices included in said supply said circuit allowing said supply and at least one other supply of said type which includes said circuit to be operated in synchronism when connected in parallel across a load, said circuit comprising:
   (a) transformer means having a first winding connected in parallel with another first winding of said transformer means in said circuit included in said at least one other paralleled supply and having a second winding across which a synchronizing signal appears;
   (b) first unidirectional conduction means responsive to said synchronizing signal for connecting said synchronizing signal to said oscillator means; and
   (c) second unidirectional conduction means responsive to said high frequency signal for connecting said high frequency signal to said second winding said oscillator means generating said high frequency signal in response to said synchronizing signal when said synchronizing signal occurs in time before said predetermined time-out said synchronizing signal being received on said first winding and said oscillator means generating said high frequency signal when said predetermined time-out occurs before said first winding receives a synchronizing signal the conduction of said second unidirectional conduction means allowing said high frequency signal to be connected to said second winding to thereby become said synchronizing signal.

7. The circuit of claim 6 wherein said oscillator means has a control input and an output and said first and second unidirectional conduction means are first and second diodes said first diode connecting said control input to said second winding and said second diode connecting said output to said second winding.

8. The circuit of claim 6 or 7 wherein said conduction means further includes switching means connected between said second unidirectional conduction means and said oscillator means said switching means conducting in response to said high frequency signal.

9. The circuit of claim 8 wherein said switching means is a transistor having its collector connected to circuit common, its base connected to said oscillator means to receive said high frequency signal and its emitter connected to said second unidirectional conduction means.

* * * * *